Patented Oct. 9, 1945

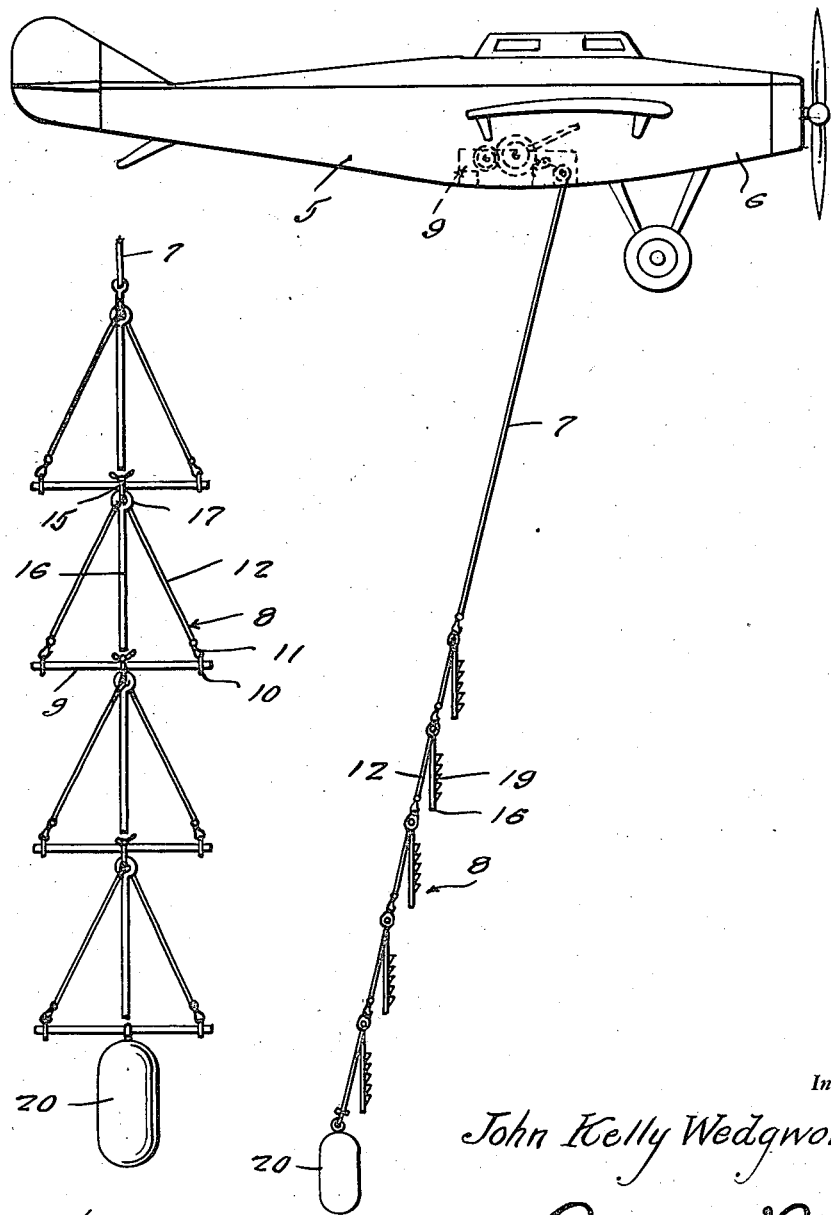

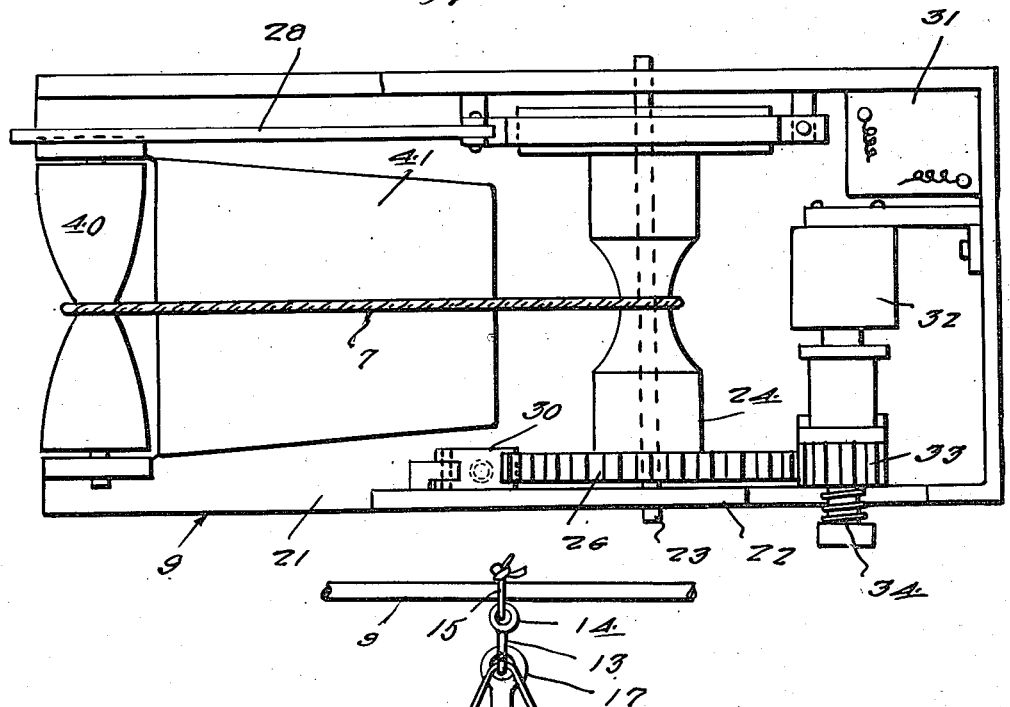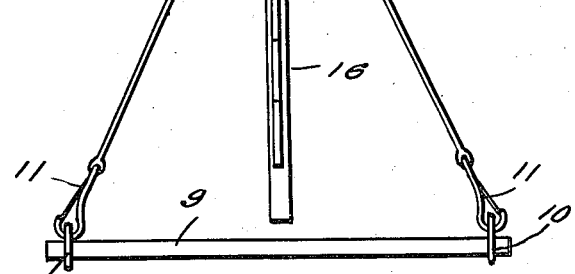

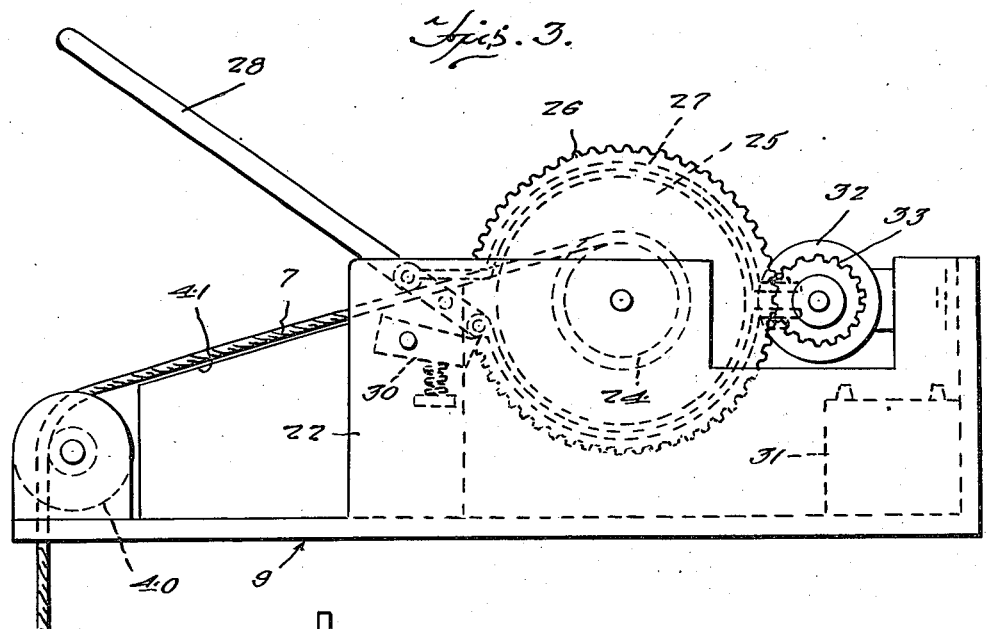
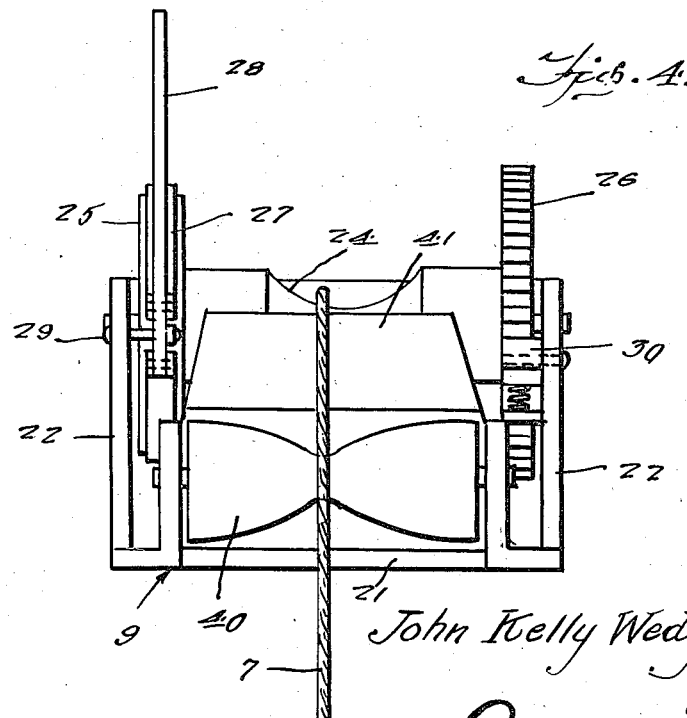

2,386,373

UNITED STATES PATENT OFFICE 2,386,373

DEMOLITION APPLIANCE FOR AIRCRAFT

John Kelly Wedgworth, York, Ala.

Application October 14, 1941, Serial No. 414,954

1 Claim. (Cl. 89—1)

The present invention appertains to new and useful improvements in appliances for war use and more particularly to a demolition appliance for aircraft.

The present invention relates to new and useful improvements in aircraft appliances intended for destructive use which can be used either in destroying other aircraft while in flight or attacking ground structures and disabling the same.

Other objects and advantages of the invention will become apparent to the reader of the following specification.

In the drawings—

Figure 1 represents a side elevational view of an aeroplane with the appliance in useful position.

Figure 2 is a top plan view of the control apparatus of the appliance.

Figure 3 is a side elevational view of the control mechanism shown in Figure 2.

Figure 4 is an end elevational view of the structure shown in Figure 3.

Figure 5 is a fragmentary rear elevational view of the demolishing assembly.

Figure 6 is a fragmentary front elevational view of one of the units of the demolishing assembly.

Referring to the drawings wherein like numerals designate like parts, it can be seen that numeral 5 generally refers to an aeroplane which includes a fuselage 6 having a floor formed with an opening therein through which a line and preferably a rope 7 forming part of a demolishing assembly generally referred by numeral 8 can pass as well as the units of the demolishing assembly.

Mounted upon the floor or otherwise suitably within the aircraft 5 is a control mechanism generally referred to by numeral 9 for elevating or lowering the assembly 8.

The assembly 8 consists in construction of a plurality of quickly attachable units each consisting of a cross bar 9 having rings 10 at the ends thereof adapted to be engaged by harness hooks or the like 11 at the lower end of an inverted V-shaped hanger 12, the bight of which passes through a harness hook or the like 13 having an eye 14 which is secured to the bar 9 of the overhanging unit by a rope or cord tie 15, unless, of course, it is the uppermost unit which connects to the rope 7.

A freely swingable cutter bar 16 is provided for each of the demolishing units and each of these cutter bars has an eye 17 at its upper end through which the corresponding harness hook 13 is disposed.

The forward side of each of these cutter bars 16 is provided with a plurality of longitudinally spaced cutting blades 19 of substantially V-shape and when the eye 17 of the bar 16 is supported as shown in Figure 6, the lower end barely clears the underlying cross bar 9.

Supported from the lowermost cross bar 9 is a bomb 20 of the type constructed of a fragile shell which when broken will cause the commingling of certain chemicals of an explosive or incendiary nature.

The control mechanism 9 consists of a platform 21 having side walls 22, 22 rising therefrom and through which are disposed the ends of a shaft 23 on which is a grooved spool 24, having at one end a brake drum 25 and at its opposite end a gear 26.

A brake band 27 surrounds the drum 25 and is preferably in a pair of sections each having one end anchored to an anchor member 27. The other end of one of the sections attaches to one end of a manually operative lever 28. Slightly inwardly of the connection of this band section with the lever 28, the lever 28 is pivotally supported as at 29 and further inwardly from the pivotal point 29, the remaining end of the other brake band section is attached to the lever. Obviously, by rocking the lever 28 the brake band can be applied or removed with respect to the drum 25.

A spring-pressed pawl 30 which can be conveniently actuated by the foot of the operator is also mounted on one of the walls 22 for engagement with the gear 26.

Numeral 31 denotes a battery which can be supported upon the base 21 for supplying current to a motor 32 which is preferably of the type used in conjunction with starters on automobiles. A gear 33 of the type which is moved by a spiral against the action of a spring 34 to mesh with the gear 26 when the motor 32 is energized is employed. It can be seen, that when the motor 32 is energized, the gear 33 will engage the gear 26 and wind the demolishing assembly and its hanger rope 7 onto the spool 24. However, when it is desired to lower the assembly, it will be found that the pinion 33 is removed from the gear 26 and all that is required is use of the brake 25, 27 to regulate the fall of the assembly.

In demolition work, it may be desirable to use the demolishing assembly 8 either against aerial objectives or ground objectives.

For ground objectives, the assembly is lowered as the attacking aircraft nears the ground and obviously by permitting the assembly to trail the bomb 20 will not go off until it actually hits some ground structure. In other words, there is no wasteful loss of bombs by reason of their exploding on territory unharmful to the enemy.

Should the assembly 8 encounter telephone, telegraph or high tensioned wires the cutter bars 19 will sever the same and besides clearing the way for use of the bomb 20 would also supplement destruction of the enemy's facilities.

While the foregoing specification sets forth the invention in specific terms, it is to be understood that numerous changes in shape, size and materials may be resorted to without departing from the spirit and scope of the invention as claimed hereinafter.

Having described the invention. what is claimed as new is:

A device of the character described, comprising a line adapted to be suspended from an aircraft, a plurality of demolition devices, each of said demolition devices consisting of a cross bar and a cutter bar, each of said cutter bars being provided with an eye and means passed through said eye swingably suspending said cutter bars from an intermediate point of an adjacent cross bar, and supporting members extending from one extremity of each cross bar upwardly through the eye of the cutter bar suspended immediately thereabove, and thence to the other extremity of the same cross bar.

JOHN KELLY WEDGWORTH.